(12) United States Patent
Swaminathan et al.

(10) Patent No.: US 9,456,465 B2
(45) Date of Patent: Sep. 27, 2016

(54) SILENT REDIAL DURING MOBILE-ORIGINATED CALL

(71) Applicant: QUALCOMM Incorporated, San Diego, CA (US)

(72) Inventors: Arvind Swaminathan, San Jose, CA (US); Srinivasan Balasubramanian, San Diego, CA (US); Samir V. Ginde, San Jose, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/802,793

(22) Filed: Jul. 17, 2015

(65) Prior Publication Data

US 2015/0327318 A1 Nov. 12, 2015

Related U.S. Application Data

(62) Division of application No. 13/551,535, filed on Jul. 17, 2012, now Pat. No. 9,161,380.

(60) Provisional application No. 61/509,470, filed on Jul. 19, 2011.

(51) Int. Cl.
| | | |
|---|---|---|
| *H04W 76/00* | (2009.01) | |
| *H04W 76/02* | (2009.01) | |
| *H04W 28/02* | (2009.01) | |
| *H04W 24/04* | (2009.01) | |
| *H04W 48/18* | (2009.01) | |
| *H04M 3/424* | (2006.01) | |
| *H04W 48/02* | (2009.01) | |

(52) U.S. Cl.
CPC ........... *H04W 76/027* (2013.01); *H04M 3/424* (2013.01); *H04W 24/04* (2013.01); *H04W 28/0268* (2013.01); *H04W 48/18* (2013.01); *H04W 48/02* (2013.01)

(58) Field of Classification Search
None
See application file for complete search history.

(56) References Cited

U.S. PATENT DOCUMENTS

| | | | |
|---|---|---|---|
| 6,845,245 | B2 | 1/2005 | Hunzinger |
| 8,660,527 | B2 | 2/2014 | Nookala et al. |
| 2004/0252656 | A1 | 12/2004 | Shiu et al. |
| 2005/0147052 | A1 | 7/2005 | Wu |
| 2006/0120355 | A1 | 6/2006 | Zreiq et al. |
| 2007/0232294 | A1 | 10/2007 | Welnick |

(Continued)

FOREIGN PATENT DOCUMENTS

| | | |
|---|---|---|
| GB | 2472596 A | 2/2011 |
| RU | 2421911 C2 | 6/2011 |

(Continued)

OTHER PUBLICATIONS

International Search Report and Written Opinion—PCT/US2012/047408—ISA/EPO—Sep. 26, 2012.

(Continued)

*Primary Examiner* — Diane Mizrahi
(74) *Attorney, Agent, or Firm* — Patterson & Sheridan, L.L.P.

(57) ABSTRACT

Aspects of the present disclosure provide techniques to speed up and improve silent redial success rates in wireless communications. A user equipment (UE) may determine how to attempt retrying a mobile originated (MO) call and procedures for selecting a subsequent system for attempting the call based, at least in part, on a restriction status of the call and a detected failure.

4 Claims, 7 Drawing Sheets

(56) References Cited

U.S. PATENT DOCUMENTS

| | | |
|---|---|---|
| 2008/0248795 A1 | 10/2008 | Petersen et al. |
| 2010/0177629 A1 | 7/2010 | Payyappilly et al. |
| 2011/0117905 A1 | 5/2011 | Huang et al. |
| 2011/0117916 A1 | 5/2011 | Dahlen et al. |
| 2011/0149725 A1 | 6/2011 | Zhao et al. |
| 2013/0023265 A1 | 1/2013 | Swaminathan et al. |
| 2014/0256365 A1* | 9/2014 | Schmidt .................. H04W 4/12 455/466 |
| 2015/0119089 A1* | 4/2015 | Okabe ................ H04W 76/045 455/458 |

FOREIGN PATENT DOCUMENTS

| | | |
|---|---|---|
| WO | WO-2007092788 A2 | 8/2007 |
| WO | WO-2011084753 A1 | 7/2011 |

OTHER PUBLICATIONS

Taiwan Search Report—TW101126037—TIPO—Oct. 22, 2014.
Canadian Office Action dated Dec. 16, 2015, issued in Canadian Patent Application No. 2841958, 3 pages.

* cited by examiner

SILENT REDIAL DURING MOBILE-ORIGINATED CALL

CROSS-REFERENCE TO RELATED APPLICATIONS

This application is a divisional of U.S. patent application Ser. No. 13/551,535, entitled "SILENT REDIAL DURING MOBILE-ORIGINATED CALL," which was filed on Jul. 17, 2012, and which claims benefit of priority from U.S. Provisional Application Ser. No. 61/509,470, filed on Jul. 19, 2011, the entire contents of which are incorporated herein by reference.

BACKGROUND

1. Field

Aspects of the present disclosure relate generally to wireless communications, and more particularly, to techniques for improving silent redial during a mobile originated (MO) call.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels. Each of the NS independent channels corresponds to a dimension. The MIMO system can provide improved performance (e.g., higher throughput and/or greater reliability) if the additional dimensionalities created by the multiple transmit and receive antennas are utilized.

SUMMARY

In an aspect of the disclosure, a method for wireless communications is provided. The method generally includes detecting a failure that occurs during a mobile originated call, determining how to attempt retrying the call based, at least in part, on whether or not the call is restricted to a particular radio access technology (RAT), and attempting to retry the call.

In an aspect of the disclosure, a method for wireless communications is provided. The method generally includes detecting a failure that occurs during a mobile originated call in a current system, selecting a subsequent system for attempting the call based, at least in part, on whether or not the mobile originated call is restricted to a particular radio access technology (RAT) and a feature of the failure, and attempting the call based on the selected subsequent system.

In an aspect of the disclosure, a method for wireless communications is provided. The method generally includes detecting a failure that occurs during setup of a mobile originated call from a user equipment (UE) due to lack of sufficient resources at a base station (BS), determining quantized channel information (QCI) in a dedicated bearer set up to establish a call over a first radio access technology (RAT), and redirecting the UE to another system in an effort to speed up a silent redial procedure.

In an aspect of the disclosure, a method for wireless communications is provided. The method generally includes attempting a mobile original call, receiving a quality of service (QoS) failure message in response to attempting the call, determining that the QoS set up failure is due to lack of resources at a destination if a dedicated bearer with required QoS has been set up locally, and re-attempting the call in an effort to save the call after a predetermined amount of time.

In an aspect of the disclosure, an apparatus for wireless communications is provided. The apparatus generally includes means for detecting a failure that occurs during a mobile originated call, means for determining how to attempt retrying the call based, at least in part, on whether or not the call is restricted to a particular radio access technology (RAT), and means for attempting to retry the call.

In an aspect of the disclosure, an apparatus for wireless communications is provided. The apparatus generally includes means for detecting a failure that occurs during a mobile originated call in a current system, means for selecting a subsequent system for attempting the call based, at least in part, on whether or not the mobile originated call is restricted to a particular radio access technology (RAT) and a feature of the failure, and means for attempting the call based on the selected subsequent system.

In an aspect of the disclosure, an apparatus for wireless communications is provided. The apparatus generally includes means for detecting a failure that occurs during setup of a mobile originated call from a user equipment (UE) due to lack of sufficient resources at a base station (BS), means for determining quantized channel information (QCI) in a dedicated bearer set up to establish a call over a first radio access technology (RAT), and means for redirecting the UE to another system in an effort to speed up a silent redial procedure.

In an aspect of the disclosure, an apparatus for wireless communications is provided. The apparatus generally includes means for attempting a mobile original call, means for receiving a quality of service (QoS) failure message in response to attempting the call, means for determining that the QoS set up failure is due to lack of resources at a destination if a dedicated bearer with required QoS has been set up locally, and means for re-attempting the call in an effort to save the call after a predetermined amount of time.

In an aspect of the disclosure, an apparatus for wireless communications is provided. The apparatus generally includes at least one processor and a memory coupled to the at least one processor. The at least on processor is generally configured to detect a failure that occurs during a mobile originated call, determine how to attempt retrying the call based, at least in part, on whether or not the call is restricted to a particular radio access technology (RAT), and attempt to retry the call.

In an aspect of the disclosure, an apparatus for wireless communications is provided. The apparatus generally includes at least one processor and a memory coupled to the at least one processor. The at least on processor is generally configured to detect a failure that occurs during a mobile originated call in a current system, select a subsequent system for attempting the call based, at least in part, on whether or not the mobile originated call is restricted to a particular radio access technology (RAT) and a feature of the failure, and attempt the call based on the selected subsequent system.

In an aspect of the disclosure, an apparatus for wireless communications is provided. The apparatus generally includes at least one processor and a memory coupled to the at least one processor. The at least on processor is generally configured to detect a failure that occurs during setup of a mobile originated call from a user equipment (UE) due to lack of sufficient resources at a base station (BS), determine quantized channel information (QCI) in a dedicated bearer set up to establish a call over a first radio access technology (RAT), and redirect the UE to another system in an effort to speed up a silent redial procedure.

In an aspect of the disclosure, an apparatus for wireless communications is provided. The apparatus generally includes at least one processor and a memory coupled to the at least one processor. The at least on processor is generally configured to attempt a mobile original call, receive a quality of service (QoS) failure message in response to attempting the call, determine that the QoS set up failure is due to lack of resources at a destination if a dedicated bearer with required QoS has been set up locally, and re-attempt the call in an effort to save the call after a predetermined amount of time.

In an aspect of the disclosure, a computer-program product for wireless communications is provided. The computer-program product generally comprises a non-transitory computer-readable medium having code stored thereon, the code executable by one or more processors for detecting a failure that occurs during a mobile originated call, determining how to attempt retrying the call based, at least in part, on whether or not the call is restricted to a particular radio access technology (RAT), and attempting to retry the call.

In an aspect of the disclosure, a computer-program product for wireless communications is provided. The computer-program product generally comprises a non-transitory computer-readable medium having code stored thereon, the code executable by one or more processors for detecting a failure that occurs during a mobile originated call in a current system, selecting a subsequent system for attempting the call based, at least in part, on whether or not the mobile originated call is restricted to a particular radio access technology (RAT) and a feature of the failure, and attempting the call based on the selected subsequent system.

In an aspect of the disclosure, a computer-program product for wireless communications is provided. The computer-program product generally comprises a non-transitory computer-readable medium having code stored thereon, the code executable by one or more processors for detecting a failure that occurs during setup of a mobile originated call from a user equipment (UE) due to lack of sufficient resources at a base station (BS), determining quantized channel information (QCI) in a dedicated bearer set up to establish a call over a first radio access technology (RAT), and redirecting the UE to another system in an effort to speed up a silent redial procedure.

In an aspect of the disclosure, a computer-program product for wireless communications is provided. The computer-program product generally comprises a non-transitory computer-readable medium having code stored thereon, the code executable by one or more processors for attempting a mobile original call, receiving a quality of service (QoS) failure message in response to attempting the call, determining that the QoS set up failure is due to lack of resources at a destination if a dedicated bearer with required QoS has been set up locally, and re-attempting the call in an effort to save the call after a predetermined amount of time.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
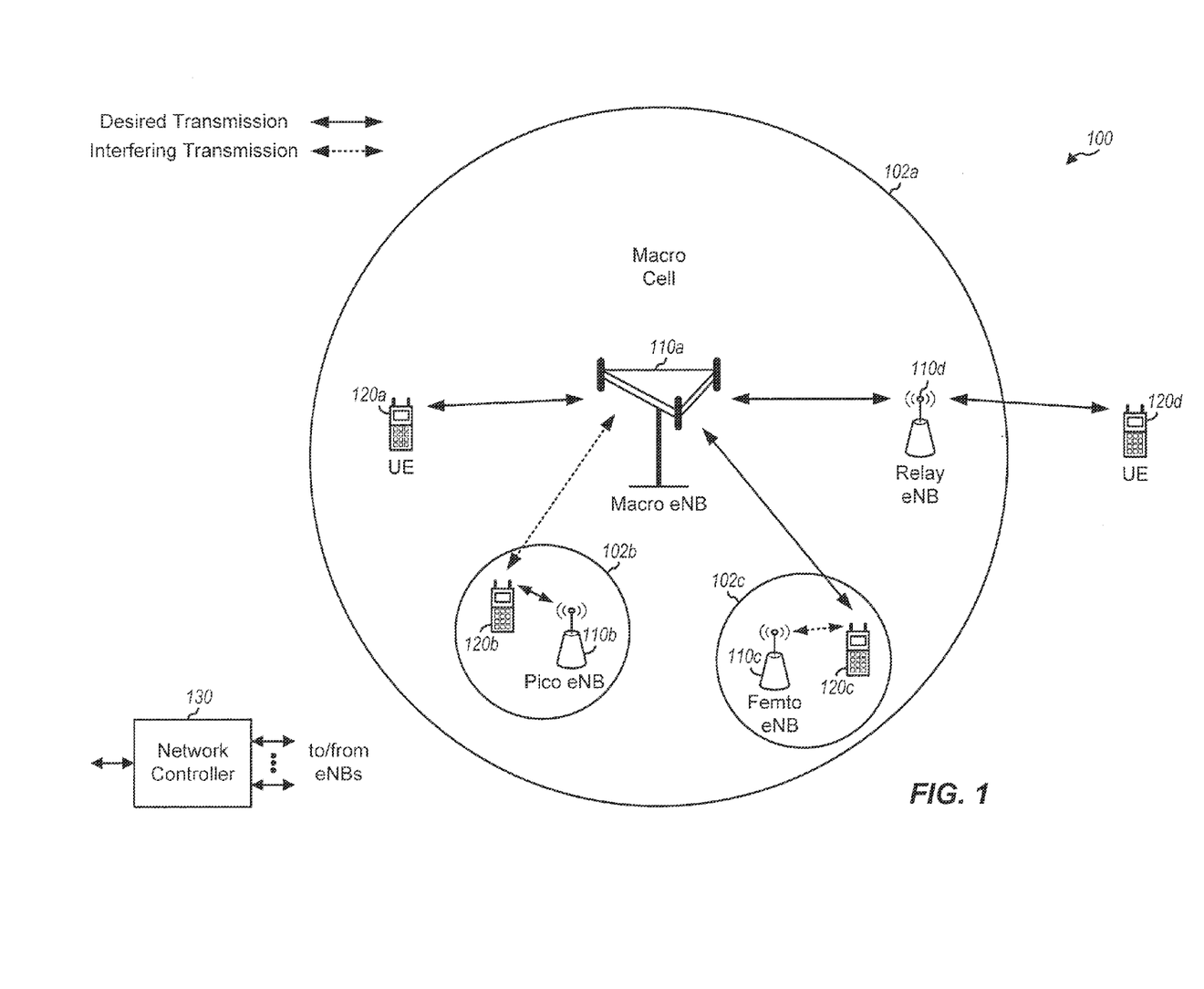
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

As described in greater detail below, in some embodiments, the Node Bs 110 may implement the functionality described herein for improving silent redial in mobile originated calls. For example, a Node B may detect failures during mobile originated calls from a UE and may redirect the UE to another system in an effort to speed up a silent redial procedure.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

As described in greater detail below, in some embodiments, the UEs 120 may implement the functionality described herein for improving silent redial in mobile originated calls. For example, the UEs may maintain timers, counts, and thresholds for use in silent redial. UEs 120 may also detect a failure during mobile originated call, determine how to attempt retrying the call, select a subsequent system for attempting the call, and attempt to retry the call as described herein.

Figure 2:
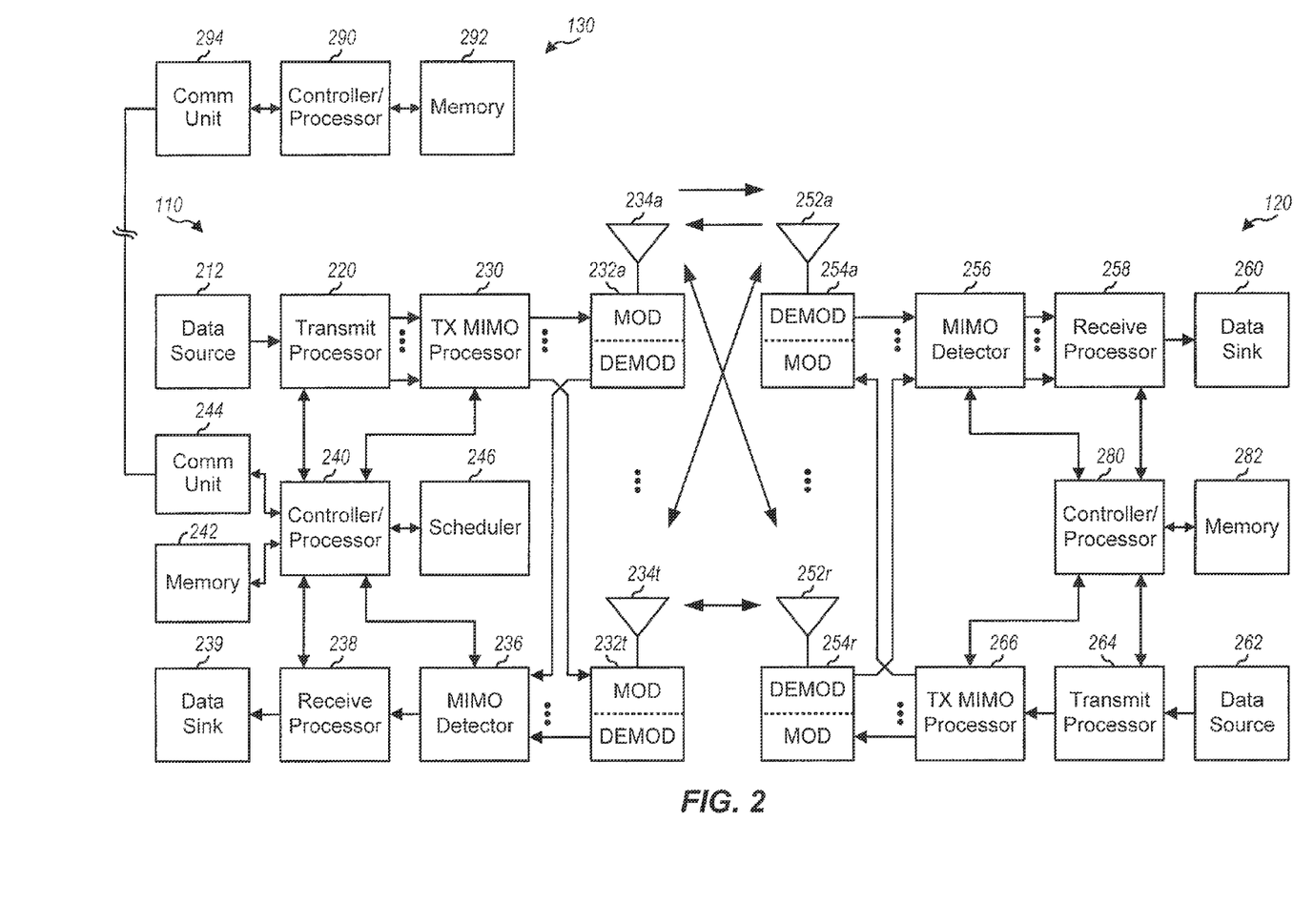
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine RSRP, RSSI, RSRQ, CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct operations at base station 110 and UE 120, respectively. Processors 240 and 280 and/or other processors and modules at base station 110 and UE 120 may perform or direct processes for the techniques described herein. For example, according to aspects of the present disclosure, processors 240 and 280 may implement the functionality described herein for improving silent redial in mobile originated calls. Memories 242 and 282 may store data and program codes for base station 110 and UE 120, respectively. A scheduler 246 may schedule UEs for data transmission on the downlink and/or uplink.

Silent Redial During MO VoLTE Call

Various failures may occur when a voice over IP over LTE (VoLTE) enabled UE places a mobile originated (MO) call. Silent redial refers to the autonomous redialing of a call by a UE without user intervention when failures occur. Silent redial may improve a user's experience, for example, by hiding recoverable failures from the user. Aspects of the present disclosure provide a framework for improving silent redial during a MO VoLTE call.

As will be described in more detail below, aspects of the present disclosure include detecting a failure that occurs during a MO call in a current system and determining how to attempt to retry the call based, at least in part, on a restriction status of the call. For example, a UE may select a subsequent system for attempting the call based, in part, on a feature of the detected failure and whether or not the MO call is restricted to a particular radio access technology (RAT). Aspects provide improvements that may speed up recovery when resource limitations at a local eNB or destination eNB cause MO call failures.

If a failure occurs during MO call establishment, the UE may attempt to perform silent redial for up to T_silent_redial seconds (e.g., 30 seconds). When a call is originated, a counter, Count_soft_failure may be initialized to 0. According to aspects, the time between silent redial attempts may not be less than T_min_spacing seconds (e.g., 4 seconds). A T_min_spacing of, for example, 4 seconds may restrict the number of call originations and may allow conditions to improve before retrying the call.

Each failure during a MO call may be classified into three categories: soft failures, hard failures, or no retry failures. As described below, a UE may select a subsequent system for attempting the call and attempt to retry the call based, in part, on the detected failure.

Soft failures occur when there is a sufficiently high probability of success if the call is re-originated over the current LTE system. Thus, in the case of a soft failure, it may be preferable to retry the MO call over the current LTE system, since acquiring another system to place the call may result in a long call setup delay.

Hard failures occur when call origination may not be performed for a long time over the current LTE system or when the probability of success of placing the MO call over the current LTE system is low. Accordingly, in the case of a hard failure, it may be preferable to retry the MO call over another system.

No retry failures occur when re-originating the call may not result in success of the MO call (e.g., SIP: 402 response received). No retry failures may also occur when the MO call is restricted to LTE and the failure is such that a call attempt may not be retried over LTE.

A MO call may be a voice over multimode call or a VoLTE restricted call. In the case of a voice over multimode call, the user interface (UI) may not have restricted the radio access technologies (RATs) over which the call may be attempted. In the case of a VoLTE restricted call, the UI may have placed a restriction that the MO call may be attempted only over LTE.

According to aspects of the present disclosure, a UE may place a voice over multimode call. If a soft failure occurs during the voice over multimode MO call, the UE may increment a counter (e.g., Count_soft_failure). The MO call may be re-attempted over the current LTE system as long as both:

Count_soft_failure≤N_soft_retry, and
Time since call origination<T_max_VoLTE.

In other words, a non-restricted MO call may be re-attempted over the current LTE system in response to a soft failure when both the count of soft failures is less than or equal to a maximum number of soft failure retry attempts and the time since call origination is less than a maximum time since call origination (e.g., 20 seconds).

A hard failure may be declared in a voice over multimode MO call, if either:

Count_soft_failure>N_soft_retry, or

Time since call origination≥T_max_VoLTE.

In response to a hard failure during a MO voice over multimode call, the UE may abandon the call over the current LTE system and may attempt to find an alternative system for retrying the call. The alternative system may be found in one of several ways. For example, if the hard failure is of type HF-RAN, the UE may attempt acquisition on inter-frequency LTE neighbor frequencies, if any, advertised by the current LTE system.

According to aspects, the UE may attempt to find an alternative system for retrying the call in response to a hard failure using parameters advertised in, for example, a system information block on a cell on which the MO call originated. For example, the UE may use inter-frequency and/or inter-RAT reselection parameters advertised in the SIB. Such parameters may assist the UE in determining the inter-frequency neighbors to scan for and prioritizing the frequencies to be used while scanning for the CS RAT. In certain scenarios, the UE may skip one or more inter-frequency neighbors. If the hard failure observed by the UE is classified as a failure that is caused, at least in part, by issues in a core network associated with the inter-frequency neighbors, the UE may not attempt the retry the call on that specific inter-frequency neighbor (the inter-frequency neighbor may be skipped).

If acquisition failures (e.g., hard failures) occur on all of the LTE neighbor frequencies, or if there no LTE inter-frequency neighbors exist, the UE may attempt acquisition on circuit-switched (CS) RATs (e.g., 1x, GSM, WCDMA). According to aspects, the UE may begin to attempt to retry the MO call on CS neighbor frequencies received in an inter-RAT neighbor list advertised on the current LTE system. Following this, the UE may scan for the most recently used (MRU) channels and other CS frequencies based on a multi-mode system selection (MMSS) algorithm.

In an effort to improve silent redial procedures, a UE may have a mechanism to remember LTE frequencies on which hard failures occurred and may avoid moving back to such frequency for reattempting the failed MO call. For example, LTE Frequency 1 may advertise LTE Frequency 2 in its inter-frequency neighbor list. Similarly, LTE Frequency 2 may advertise LTE Frequency 1 in its inter-frequency neighbor list. If a hard failure occurs on Frequency 1, the UE may attempt to retry the call on Frequency 2. If a hard failure occurs on Frequency 2, according to aspects of the present disclosure, the UE may not try to move back to Frequency 1. Instead, the UE may attempt to place the call on CS RATs. If acquisition fails on all CS RATs and time remains in the silent redial period, the UE may re-attempt the CS RAT frequencies again.

If the hard failure is of type HF-Network, the UE may attempt to retry the call on a CS RAT (e.g., 1x, GSM, WCDMA). The UE may begin with CS neighbor frequencies received in the inter-RAT neighbor list advertised on the current LTE system. Following this, the UE may scan the MRU channels and other CS frequencies based on a multi-mode system selection (MMSS) algorithm.

According to aspects of the present disclosure, a UE may place a MO VoLTE restricted call, where the UI has placed a restriction that the call may only be attempted over LTE. If a soft failure occurs during a restricted MO call, the UE may increment a counter (e.g., Count_soft_failure). The MO call may be re-attempted over the current LTE system as long as both:

Count_soft_failure≤N_soft_retry, and

Time since call origination<T_max_VoLTE.

In other words, a MO call may be re-attempted over the current LTE system in response to a soft failure when both the count of soft failures is less than or equal to a maximum number of soft failure retry attempts and the time since call origination is less than a maximum time since call origination (e.g., 20 seconds). If no inter-frequency LTE neighbors exist, the call may be re-attempted over the current LTE system until a silent redial timer (e.g., T_silent_redial) expires.

A hard failure may be declared and the steps for hard failure behavior may be followed if either:

Count_soft_failure>N_soft_retry, or

Time since call origination≥T_max_VoLTE.

If a hard failure occurs during a VoLTE restricted MO call, the UE may abandon the call over the current LTE system. The UE may attempt to find an alternate system by attempting acquisition on the frequencies listed in inter-frequency neighbor lists, if any. If no inter-frequency neighbors exist or if there is an acquisition failure (e.g., hard failure) on all of the inter-frequency neighbors, the UE may end the call.

When a UE places a VoLTE restricted call, silent redial success rates may improve if the presence of other LTE systems (e.g., roaming LTE systems) are taken into account. Thus, according to aspects of the present disclosure, a UE may attempt to retry a VoLTE restricted call on inter-frequency neighbors and roaming LTE systems.

Tables 1, 2, and 3 map example failures to desired error handling, according to aspects of the present disclosure. Failures may be handled based, at least in part, on a restriction status of the MO call, as indicated below.

TABLE 1

Mapping Failure to Desired Error Handling

| Description | Failure handling for Voice over multimode call | Failure handling fo VoLTE restricted call |
| --- | --- | --- |
| Access bar check fails on LTE - RRC connection setup not possible | Hard Failure (HF-RAN). | HF1. If there is no inter-frequency neighbor, treat it as soft failure If there is inter-freq neighbor, treat it as hard failure |
| RRC Connection establishment not possible because T302 and T305 are running | Hard Failure (HF-RAN) | HF1 |
| RACH attempt max count is reached. UE does not receive Random Access Response. | Soft failure. | Soft failure |

TABLE 1-continued

Mapping Failure to Desired Error Handling

| Description | Failure handling for Voice over multimode call | Failure handling fo VoLTE restricted call |
| --- | --- | --- |
| RRC connection establishment timeout; T300 timer expiry | Soft failure. | Soft failure |
| RRC connection reject | Hard Failure. (HF-RAN) | HF1 |
| Service reject received in response to Service Request | Hard Failure. (HF-RAN) | Hard failure |
| T3417 timeout after sending service request | Hard Failure. (HF-Network) | HF1 |
| Lower layer failure (RLF) after sending Service Request but before call establishment | RLF procedure should perform one scan on all LTE bands and end procedure. If LTE is re-acquired, IMS client/CM take no action. SIP timers to recover from any failure. If LTE is not re-acquired, then UE should scan only for CS RATs during silent redial period. | RLF procedure should restrict scans to LTE only until silent redial timer expires. If LTE is re-acquired, IMS client/CM take no action. SIP timers to recover from any failure. |
| Redirection/HO to another RAT | If RAT = 1x or GSM/WCDMA, honor Redirection/HO & place call on CS RAT using legacy CS procedures If RAT = DO, Ignore redirection/HO and declare hard failure. (HF-RAN) | Call failed. No retry. |
| Detach request with reattach required is received from the network after Service Request is sent | Hard failure (HF-Network) Skipping LTE neighbor frequency after hard failure may help here. | Soft failure. Re-attach over LTE and retry after IMS registration. No retry if soft failure is difficult to implement. |
| Detach request without reattach required | Hard failure (HF-Network) Skipping LTE neighbor frequency after hard failure may help here. | No retry |
| TAU procedure triggered OR Transmission failure of Service Request with TA change | Soft failure Retry call after TAU with the LTE network | Soft Failure |
| SIP: 503 (Service Unavailable). Source P-CSCF is expected to send this when QoS establishment fails. | Hard Failure. (HF-RAN) | HF1 |
| Unsuccessful session establishment with the following SIP response codes: 400, 401, 404~408, 410, 413~416, 420, 421, 423, 481~485, 488, 489, 491, 493, 494, 500~505, 513, 604, 606. | Hard Failure. (HF-Network) | HF1 |
| Unsuccessful session establishment with the following SIP response codes: 402, 403, 412, 429, 480, 486, 487, 600, 603. | No retry | No retry |
| 580 (QoS setup failed on destination side) | Soft failure. Retry after longer timer | Soft failure. Retry after longer timer |

TABLE 2

Alternative Scenarios

| Description | Handling for Voice over multimode call | Handling for VoLTE restricted call |
| --- | --- | --- |
| PS HO takes UE to another LTE eNB on | No action from IMS client/CM. LTE level retransmissions and | No action from IMS client/CM. LTE level retransmissions and SIP timers |

TABLE 2-continued

Alternative Scenarios

| Description | Handling for Voice over multimode call | Handling for VoLTE restricted call |
|---|---|---|
| same frequency or different frequency Unsuccessful session establishment with the following SIP response codes: 422 | SIP timers used to recover from any failure. IMS client will retry | used to recover from any failure. |

TABLE 3

UE behavior during each type of failure

| Failure Type | Failure handling for Voice over multimode call | Failure handling for VoLTE restricted call |
|---|---|---|
| HF-RAN | Leave current LTE system and retry on other systems starting with inter-frequency neighbors in SIBs | N/A |
| HF-network | Leave current LTE system and retry on CS RATs starting with inter-RAT neighbors in SIBs | N/A |
| Soft Failure | Increment Count_soft_failure. If Count_soft_failure <= N_soft_retry AND Time since call origination is < T_max_VoLTE, retry on current LTE system after T_min_spacing Else, treat it as HF-RAN | If there are no inter-frequency neighbors, retry on current LTE systemIf there are inter-frequency neighbors: 1. Increment Count_soft_failure. 2. If Count_soft_failure <= N_soft_retry AND Time since call origination is < T_max_VoLTE, retry on current LTE system after T_min spacing Else, retry on LTE neighbor-frequency |
| No retry | End the call | End the call |
| Hard failure | N/A | If there are inter-frequency neighbors, retry on them Else end the call |
| HF1 | N/A | If there is no inter-frequency neighbor, treat it as soft failure If there is inter-freq neighbor, treat it as hard failure |

In certain situations, silent redial may take the UE to another RAT. After the call ends, the UE may use mechanisms known by those skilled in the art to move back to LTE. For example, the UE may move back to LTE through better service reselection (BSR) scans or high priority public land mobile network (HP-PLMN) scans. The UE may also move back to LTE through inter-RAT procedures, such as reselection, redirection, handover, etc.

Figure 3:
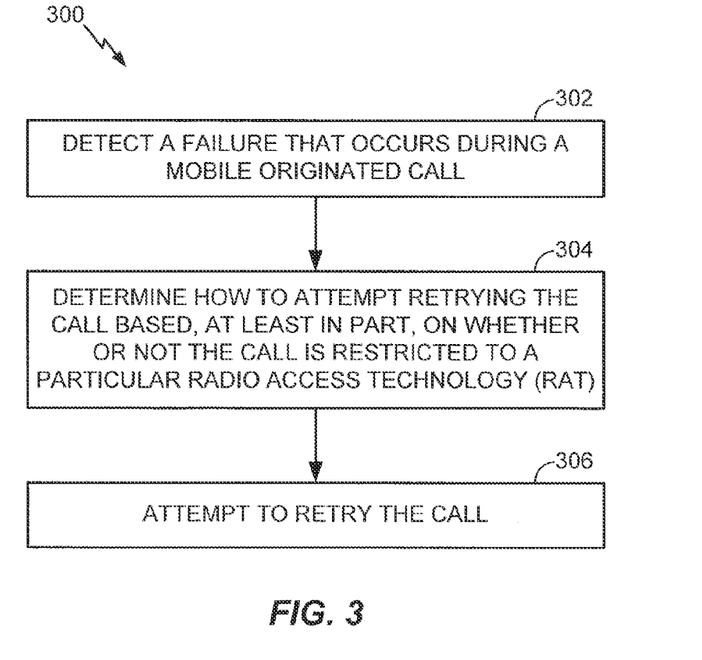
FIG. 3 illustrates example operations for attempting to retry a MO call, according to aspects of the present disclosure.

FIG. 3 illustrates example operations 300 for attempting to retry a mobile originated call, according to aspects of the present disclosure. The operations 300 may be performed, for example, by controller/processor 280 and memory 282 of UE 120 of FIG. 2.

At 302, the UE may detect a failure that occurs during a mobile originated call. At 304, the UE may determine how to attempt retrying the call based, at least in part, on whether or not the call is restricted to a particular radio access technology (RAT). At 306, the UE may attempt to retry to call.

As described above, the detected failure may be one of a soft failure, a hard failure, and a no retry failure. If the failure is hard failure and if the call is not restricted, determining how to attempt retrying the call may include first attempting acquisition on inter-frequency neighbors and attempting acquisition on another RAT if there is an acquisition failure on all of the inter-frequency neighbors. If the failure is a hard failure, and the call is restricted, determining how to attempt retrying the call may include ending the call if no inter-frequency neighbors exist or when there is an acquisition failure on all of the inter-frequency neighbors.

If the failure is a soft failure and no inter-frequency neighbors exist, determining how to attempt retrying the call may include re-attempting the call over the current system until a timer expires.

Figure 4:
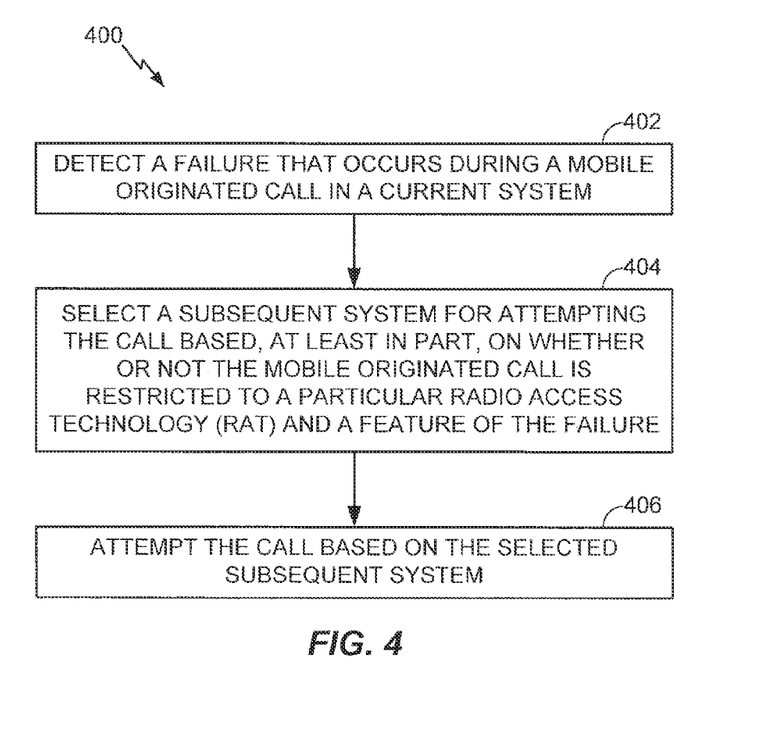
FIG. 4 illustrates example operations for attempting a MO call based on a selected subsequent system, according to aspects of the present disclosure.

FIG. 4 illustrates example operations 400 for selecting a subsequent system for attempting a MO call, according to aspects of the present disclosure. The operations 400 may be performed, for example, by controller/processor 280 and memory 282 of UE 120 of FIG. 2.

At 402, the UE may detect a failure that occurs during a mobile originated call in a current system. At 404, the UE may select a subsequent system for attempting the call based, at least in part, on whether or not the mobile originated call is restricted to a particular radio access technology (RAT) and a feature of the failure. At 406, the UE may attempt the call based on the selected subsequent system.

As described above, the subsequent system selected for attempting the call may be the same as the current system when the failure is a soft failure or when the call is restricted and the failure is a hard failure. The subsequent system may be different than the current system when the failure is hard failure, the call is not restricted, and acquisition failures occur on all neighbor frequencies.

Figure 5:
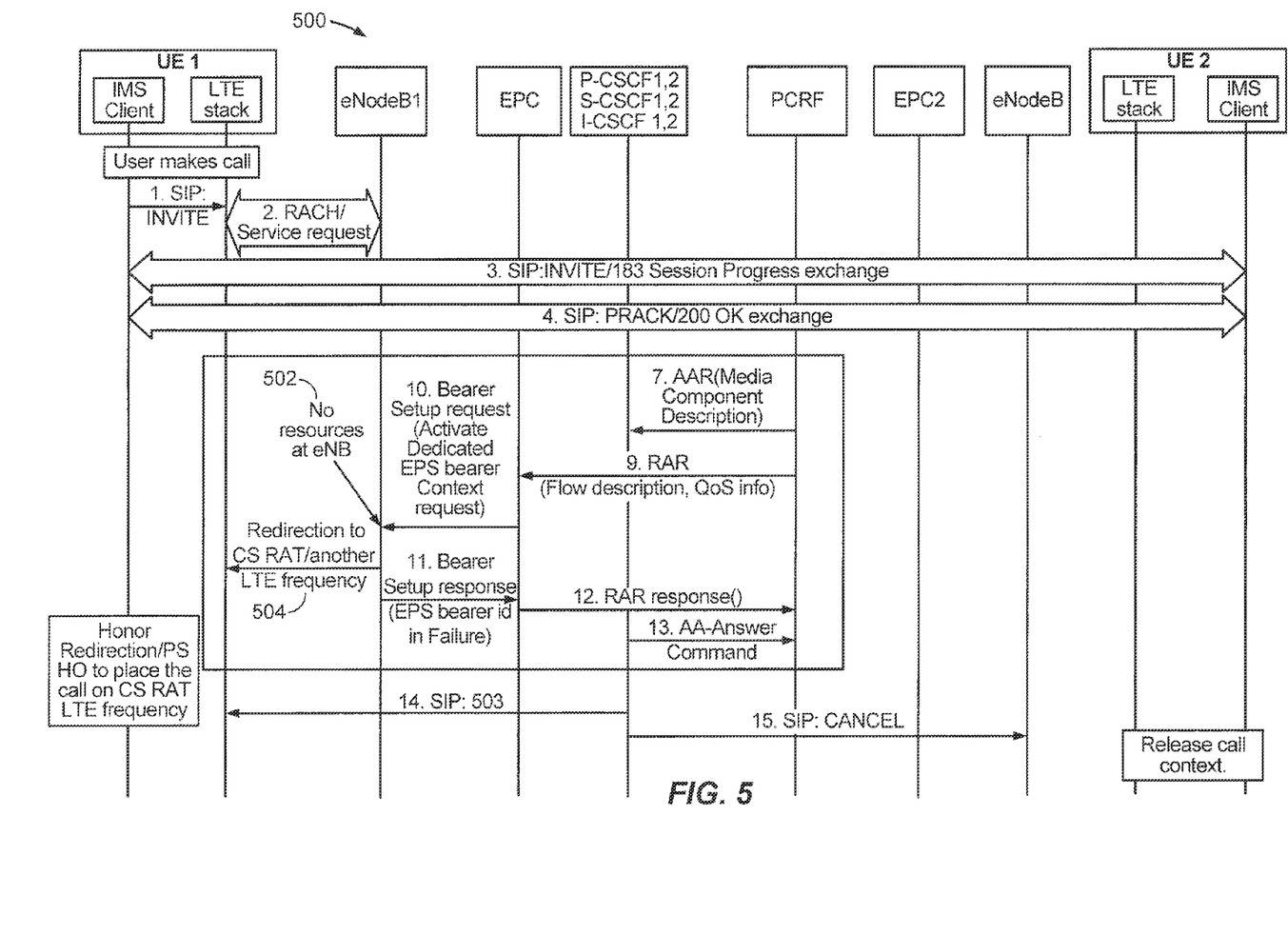
FIG. 5 illustrates an example call-flow diagram, which may improve a silent redial success rate when resource reservation fails at a local eNB, according to aspects of the present disclosure.

Aspects of the present disclosure provide improvements that may speed up recovery when resource limitations at a local eNB or destination eNB cause a silent redial failure. FIG. 5 illustrates an example call flow 500 to salvage a VoLTE MO call if the resource reservation fails at the local eNB. When a local eNB (eNodeB1 of FIG. 5) does not have sufficient resources to grant a requested dedicated bearer, it may use the quantized channel information (QCI) in the dedicated bearer set up request to determine if the bearer set up request was for a VoLTE call.

For example, at 502, the local eNodeB1 may not have enough resources. At 504, upon determining that bearer setup request for was a VoLTE call, the local eNodeB1 may redirect or handover the UE to another LTE frequency or CS RAT in an effort to speed up the silent redial procedure.

Figure 6:
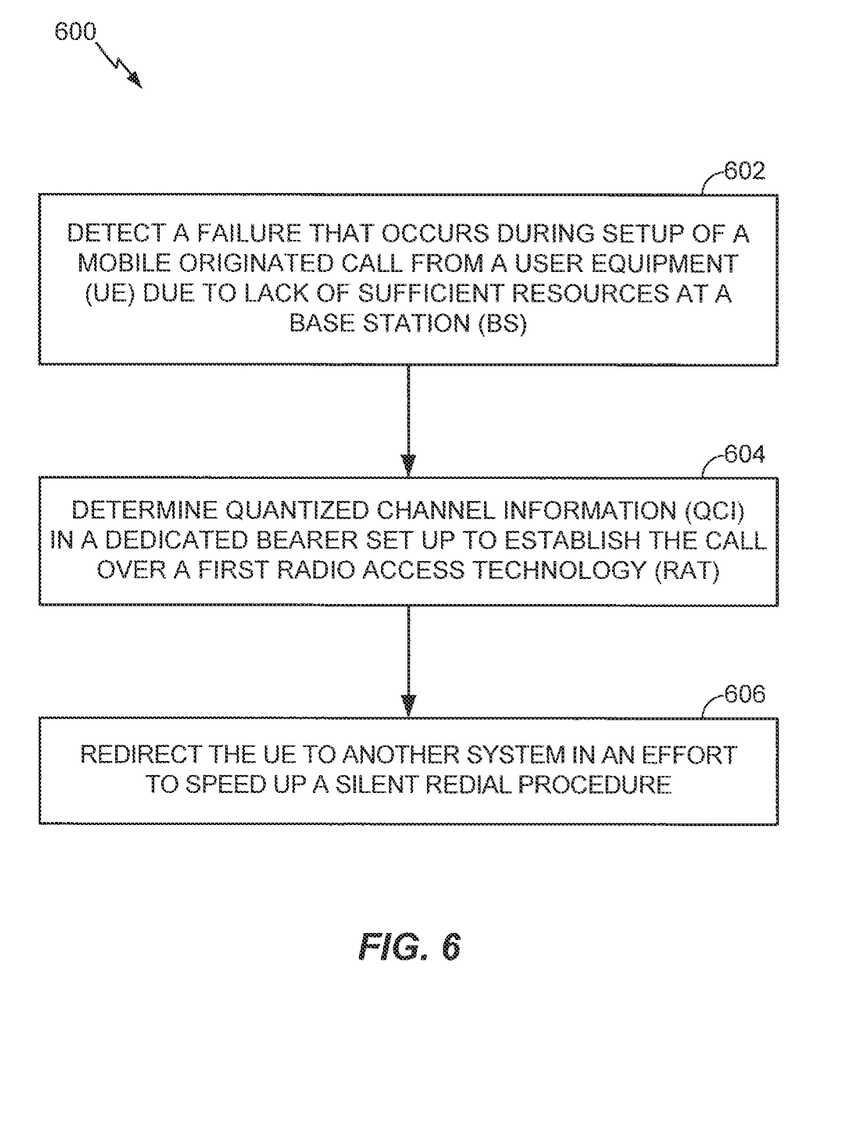
FIG. 6 illustrates example operations for redirecting a UE to another system when, for example, a resource reservation failure occurs at a local eNB, according to aspects of the present disclosure.

FIG. 6 illustrates example operations 600 that may be performed to improve a silent redial procedure, in accordance with aspects of the present disclosure. The operations 600 may be performed, for example, by controller/processor 240 and memory 242 of BS 110 of FIG. 2.

At 602, the BS may detect a failure that occurs during setup of a mobile originated call from a UE due to lack of sufficient resources at the BS. At 604, the BS may determine quantized channel information (QCI) in a dedicated bearer set up to establish the call over a first radio access technology (RAT). At 606, the BS may redirect the UE to another system in an effort to speed up a silent redial procedure.

Figure 7:
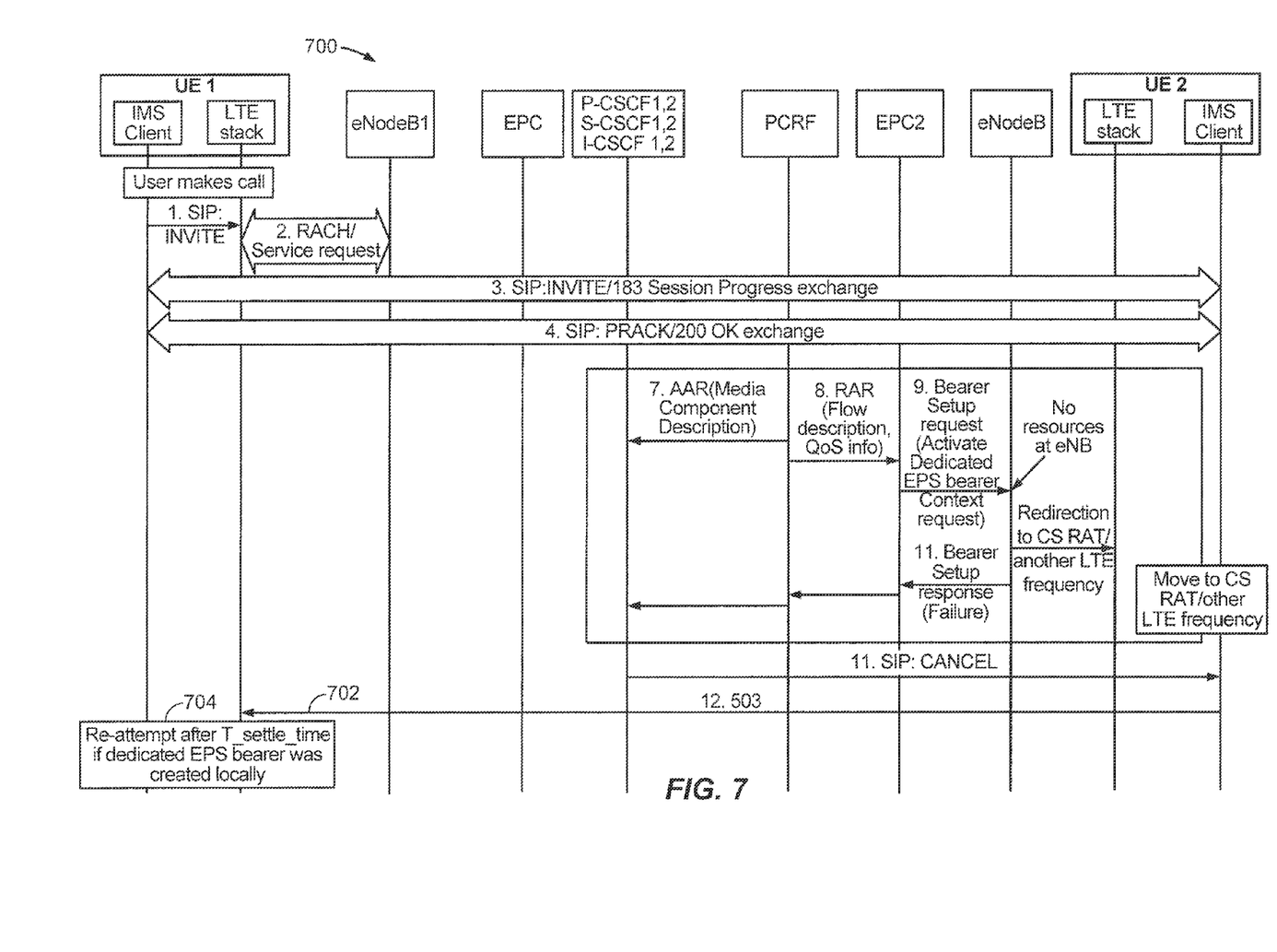
FIG. 7 illustrates an example call-flow diagram, which may improve a silent redial success rate when resource reservation fails at a destination eNB, according to aspects of the present disclosure.

FIG. 7 illustrates an example call flow 700 to improve recovery when system limitations at a destination eNB cause a silent redial failure. A UE placing a VoLTE call may check if a dedicated bearer with a required quality of service (QoS) has been set up locally, after receiving a 503 QoS. If a local bearer with the required QoS has been set up locally, the UE may determine that the failure may be due to the destination side (e.g., at terminating eNB, eNodeB of FIG. 7). Thus, the UE may have a high chance of successfully re-attempting the call if the UE retires the call after T_settle_time. T_settle_time may be used to allow the destination eNB to complete redirection and/or handoff procedures and update registration context.

As illustrated in FIG. 7, lack of resources at terminating eNodeB may cause a VoLTE failure. At 702, a UE placing a VoLTE call may receive a 503 QoS. At 704, the UE may reattempt the call after T_settle_time, if the UE determines that the dedicated EPS bearer with the required QoS was created locally.

Figure 8:
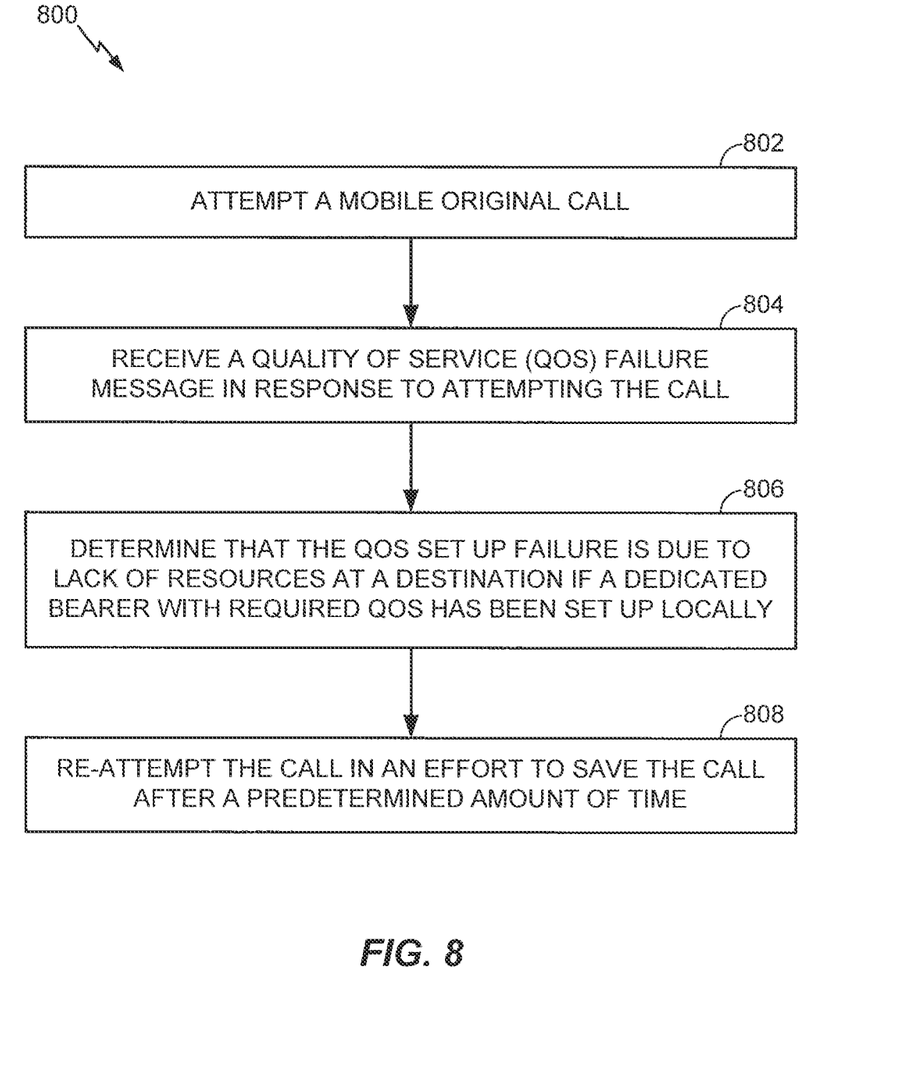
FIG. 8 illustrates example operations for attempting to salvage a MO call when, for example, a resource reservation failure occurs at a destination eNB, according to aspects of the present disclosure.

FIG. 8 illustrates example operations 800 that may be performed to improve a silent redial procedure, in accordance with aspects of the present disclosure. The operations 800 may be performed, for example, by controller/processor 280 and memory 282 of UE 120 of FIG. 2.

At 802, the UE may attempt a mobile original call. At 804, the UE may receive a quality of service (QoS) failure message in response to attempting the call. At 806, the UE may determine that the QoS set up failure is due to lack of resources at a destination if a dedicated bearer with required QoS has been set up locally. At 808, the UE may re-attempt the call in an effort to save the call after a predetermined amount of time.

Aspects of the present disclosure provide techniques to speed up and improve silent redial success rates. As described above, a UE may determine how to attempt retrying a MO call and procedures for selecting a subsequent system for attempting the call based, at least in part, on a restriction status of the call and a detected failure.

Aspects provide improvements for silent redial implemented by a local eNB or a UE. A local eNB may salvage a call due to resource reservation failure at the local eNB by redirecting the UE to another LTE frequency or CS RAT if the bearer set up request was for a VoLTE call. A UE may retry a MO call after a predetermined amount of time lapses, if the UE has determined that a QoS failure occurred at the destination eNB.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
   detecting a failure that occurs during setup of a mobile originated call from a user equipment (UE) due to lack of sufficient resources at a base station (BS);
   determining quantized channel information (QCI) in a dedicated bearer set up to establish the mobile originated call over a first radio access technology (RAT); and
   redirecting the UE to another system in an effort to speed up a silent redial procedure.

2. An apparatus for wireless communications, comprising:
   means for detecting a failure that occurs during setup of a mobile originated call from a user equipment (UE) due to lack of sufficient resources at a base station (BS);
   means for determining quantized channel information (QCI) in a dedicated bearer set up to establish the mobile originated call over a first radio access technology (RAT); and
   means for redirecting the UE to another system in an effort to speed up a silent redial procedure.

3. An apparatus for wireless communications, comprising:
   at least one processor configured to:
      detect a failure that occurs during setup of a mobile originated call from a user equipment (UE) due to lack of sufficient resources at a base station (BS);
      determine quantized channel information (QCI) in a dedicated bearer set up to establish the mobile originated call over a first radio access technology (RAT); and
      redirect the UE to another system in an effort to speed up a silent redial procedure; and
   a memory coupled to the at least one processor.

4. A non-transitory computer-readable medium having code stored thereon, the code executable by one or more processors for:
   detecting a failure that occurs during setup of a mobile originated call from a user equipment (UE) due to lack of sufficient resources at a base station (BS);
   determining quantized channel information (QCI) in a dedicated bearer set up to establish the mobile originated call over a first radio access technology (RAT); and
   redirecting the UE to another system in an effort to speed up a silent redial procedure.

* * * * *